Dec. 6, 1960    W. S. MOTTE ET AL    2,963,138
FRONT FEED MECHANISM FOR ACCOUNTING MACHINES
Filed Feb. 28, 1958    4 Sheets-Sheet 1
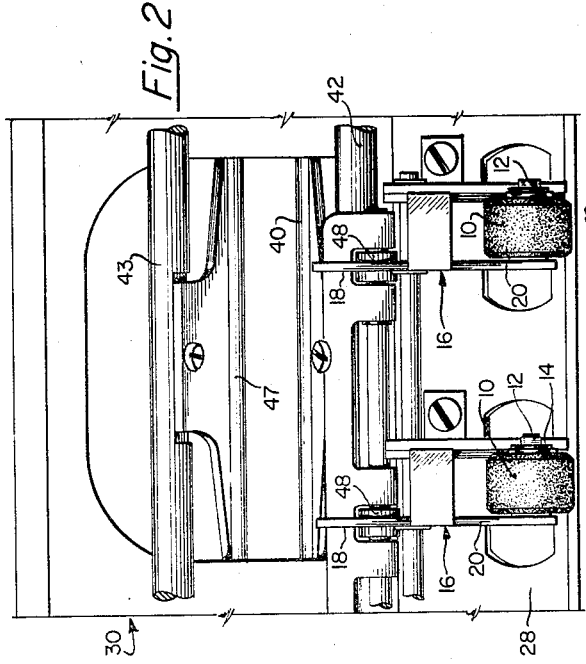
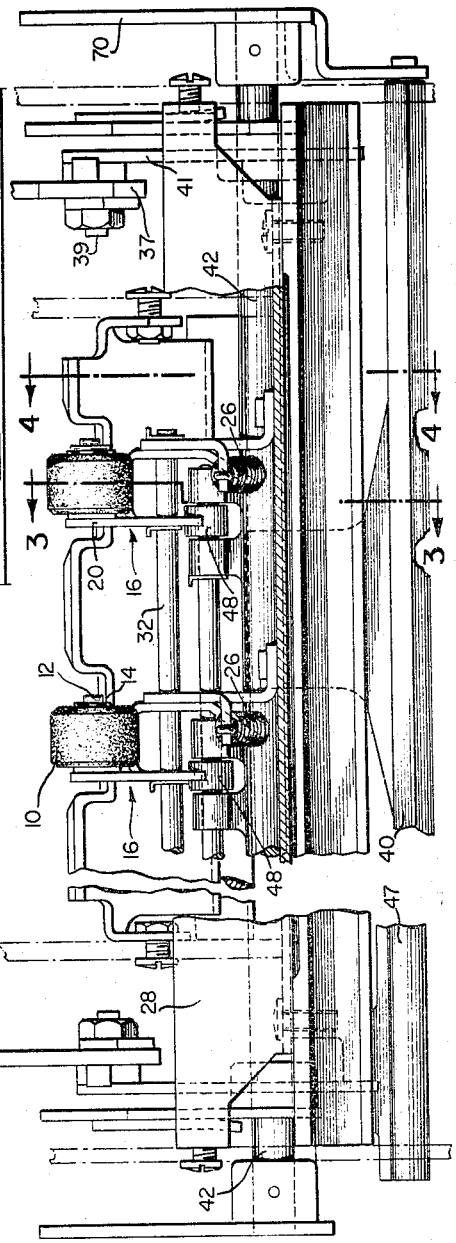
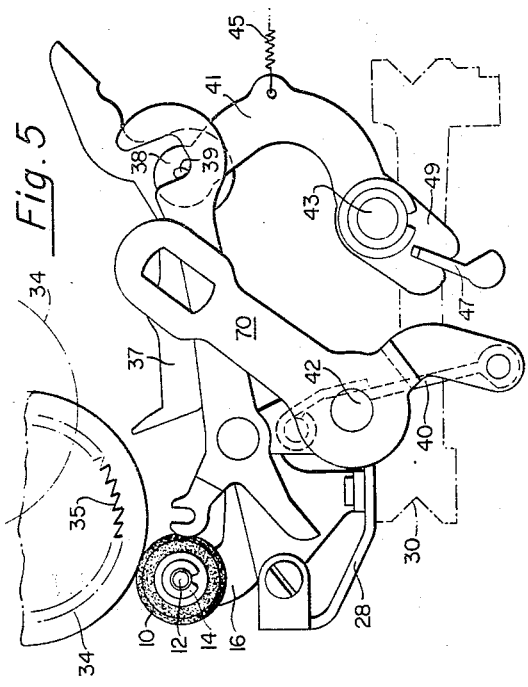
INVENTORS.
RICHARD A. WALLACE
WALTER S. MOTTE
BY
AGENT

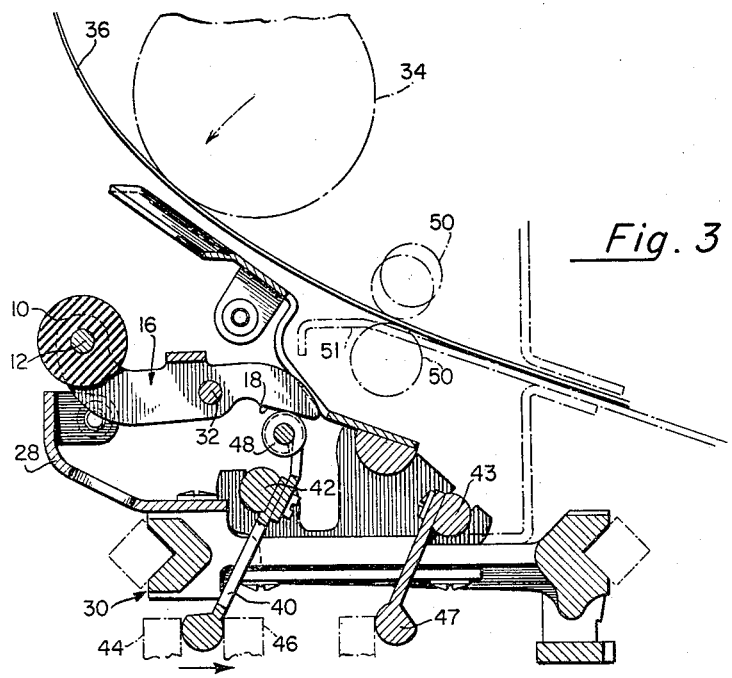
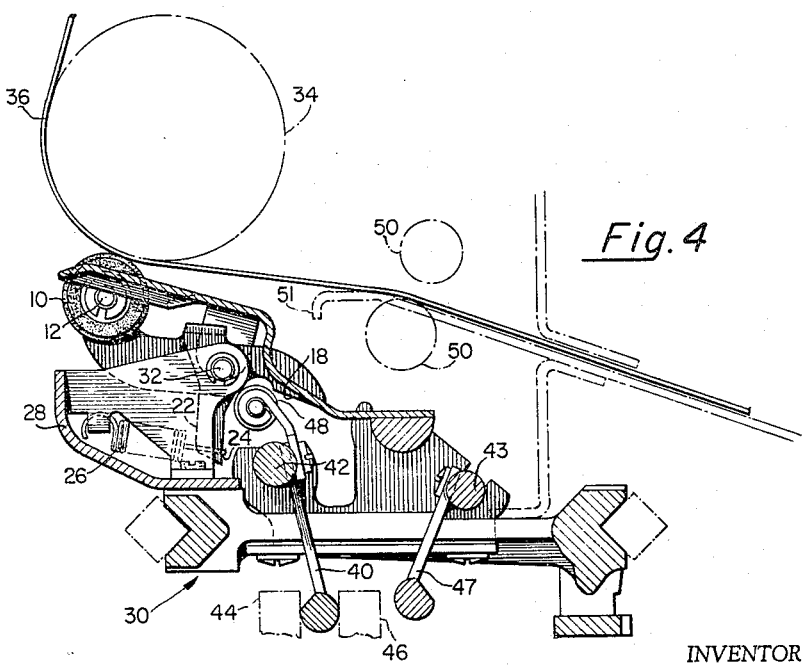

INVENTORS.
RICHARD A. WALLACE
WALTER S. MOTTE

BY

AGENT

United States Patent Office 2,963,138
Patented Dec. 6, 1960

2,963,138
FRONT FEED MECHANISM FOR ACCOUNTING MACHINES

Walter S. Motte, Philadelphia, and Richard A. Wallace, Port Kennedy, Pa., assignors to Burroughs Corporation, Detroit, Mich., a corporation of Michigan Filed Feb. 28, 1958, Ser. No. 718,191

8 Claims. (Cl. 197—128)

This invention relates to improvements in carriage constructions for accounting and like machines, and particularly, although not necessarily exclusively, to an automatic means for energizing a platen pressure roller mechanism while substantially simultaneously deenergizing a document feeding mechanism and vice versa.

In automatic accounting machines used in banks of the type, for example described and claimed in Deighton et al. S.N. 598,454, filed July 17, 1956, entitled "Automatic Accounting Machine," and assigned to the same assignee as the present invention, the bookkeeping systems employed provide a document or ledger sheet for each depositor upon which the daily balancing of accounts takes place. A record of the day's work is generally kept on a continuous form journal roll or sheet which, together with its superimposed carbon paper, is wound across the platen roll. As the journal sheet remains in the machine during the entire accounting operational run, it is inserted at the rear thereof and fed around the platen by means of pressure rollers until its top edge passes beyond the printing line in the customary manner.

As there are generally a large number of accounts to balance and consequently a large number of ledger sheets to be handled, it is necessary that means be provided whereby these ledger sheets may be quickly inserted around the platen roll in exact relation to the next available printing line, and after the balancing operation is completed, quickly and easily removed from the machine with the least amount of effort required on the part of the operator. To accomplish this result quickly and efficiently the machine is provided with a shiftable front feed carriage having a two-position platen which is automatically moved, e.g., rocked or tilted, upwardly away from the printing line to a more accessible front feeding or open position while the travelling carriage remains stationary in a predetermined columnar location. This latter operation permits the rapid insertion and/or removal of the ledger sheet therefrom. The journal roll remains in its customary position at all times, being undisturbed by the aforementioned shifting of the carriage. Following the paper feeding operation, the carriage is moved to a closed position for printing. Record document feeding is provided by means of a driving motor located within the movable carriage of the machine and having means coupled thereto for moving the record document automatically into and out of the carriage.

In accounting machines of the aforementioned type a "positional" or analog line finding mechanism is employed. This latter mechanism functions automatically to accurately locate the next available blank line on the record document with respect to the printing station in the machine.

Many known front feed carriage mechanisms tend to cause the record document to slip or skid when the carriage including the platen is opened and/or closed. In so called manually operated machines such slippage as does occur can be compensated for by adjusting the position of the record member with respect to the platen so that the next available blank line is presented to the printing station.

Automatic accounting machines of the type employing a positional line finding mechanism depend in part upon the accuracy of the record document positioning mechanism for their extreme efficiency of operation. Obviously, slippage of the document with respect to the printing station, for example, cannot be tolerated since any variation of position thereof would nullify the automatic line finding features.

In order that record document may be moved with respect to the carriage regardless of whether the platen mechanism is in its open or closed position and regardless of the machine operating cycle there have been provided two separate document moving means. The first is the document feed roller mechanism which moves the record into and out of the carriage automatically. The second is the platen pressure roller mechanism which enables the record member to be fed around the platen during the printing cycle.

Under certain conditions of operation of the machine in order to afford a relatively smooth transition from the one document moving mechanism to another and at all times to retain positive control over the document it is necessary for both roller mechanisms to be closed. Consequently, any relative motion between the driving rollers of these two mechanisms will deleteriously affect the alignment of the document.

For example, it is apparent that if the platen pressure rollers engage and grip the ledger sheet at a time in the cycle of operation when the line finding mechanism is operating, i.e., when the document feed rollers are moving the ledger sheet, the document may skid, or may be torn or it may skew within the carriage. In any event, the line finding indication would thus be incorrect. In an extreme case the resulting error could be sufficiently great so as to cause the carriage to position the ledger sheet at an already typed line in which case the line would be typed over again blurring the information previously recorded thereon. Again, if the document is under control of the platen pressure roller mechanism at a time when the document feed roller mechanism is expelling the document from the carriage the document would be buckled in turn destroying the line finding alignment. Or, the ledger sheet might be stopped one or more line spaces beyond the next blank line in which case the recording following thereafter would be hopelessly confused.

From the foregoing it can be seen that in order to avoid the problems of tearing and/or buckling of the document by virtue of its being engaged simultaneously by both the platen pressure rollers and the document feeding rollers, and yet permit the platen to swing open and closed as called for by the desired operational routine while retaining complete control over the document it is necessary to provide means for automatically disengaging the platen pressure rollers while engaging the document feed rollers and vice versa.

In accordance with the foregoing requirements it is an important object of this invention to provide a novel feeding means for an accounting machine.

Another important object of the present invention is to provide an improved power operated automatically actuated opening and closing mechanism for a front feed paper carriage.

It is a further important object of the invention to provide automatic means for disengaging a platen pressure roller mechanism while engaging a document feeding roller mechanism and vice versa.

An additional object of the invention is to provide a simple and more efficient automatic control means for a front feed platen pressure roll apparatus, operable in timed relationship to the document feeding mechanism thus to prevent inaccurate line finding.

In accordance with a preferred embodiment of the present invention there is provided a shiftable platen and a plurality of platen pressure rollers. Each platen pressure roller is disposed on an independently supported shaft and all of the rollers are positioned in the same plane parallel to the platen, the pressure roller assembly being coextensive therewith. One end of each pressure roller structure is provided with a T-shaped crank. The horizontally extending portion of each T-shaped crank having a rearwardly projecting extension thereon providing a camming surface. The depending portion of each T-shaped crank being spring biased so that in the normal or rest condition of the mechanism all of the pressure rollers are pressed against the platen. A plurality of document feeding rollers are disposed parallel to and slightly below the rotational axis of the platen. Engagement and disengagement of the feed roll mechanism is controlled by a plurality of cams driven from the main drive of the accounting machine carriage.

A vertically projecting cam member having a follower roller at the upper end thereof is adapted to engage the cam surface of the T-shaped crank. The opposite or depending end of the cam member is secured to a horizontally disposed actuating bail which is adapted for rocking motion about an axis parallel to the platen during operational cycles of the machine. The actuation of the bail member is produced by means of oppositely disposed cam arms associated therewith, such that the platen pressure roll mechanism is opened or swung upwardly prior to the time in the machine cycle when the document feeding rollers are automatically brought into engagement with the document. The problems of tearing, stretching or buckling of the document are thus effectively and efficiently eliminated.

Further objects and advantages of the invention will appear from the following detailed description of a preferred embodiment of the invention illustrated in the accompanying drawings in which:

Fig. 1 is a front elevational view of a portion of one embodiment of the platen pressure roll mechanism of this invention;

Fig. 2 is a top plan view of a fragmentary portion of the mechanism of Fig. 1;

Fig. 3 is a sectional view in side elevation along the line 3—3 of Fig. 1; showing the pressure roll mechanism in its retracted or open condition;

Fig. 4 is a sectional view in side elevation along line 4—4 of Fig. 1, showing the pressure roll mechanism in the engaged or closed condition;

Fig. 5 is a side elevational view of one end portion of the operating mechanism used with the present invention;

Figure 6:
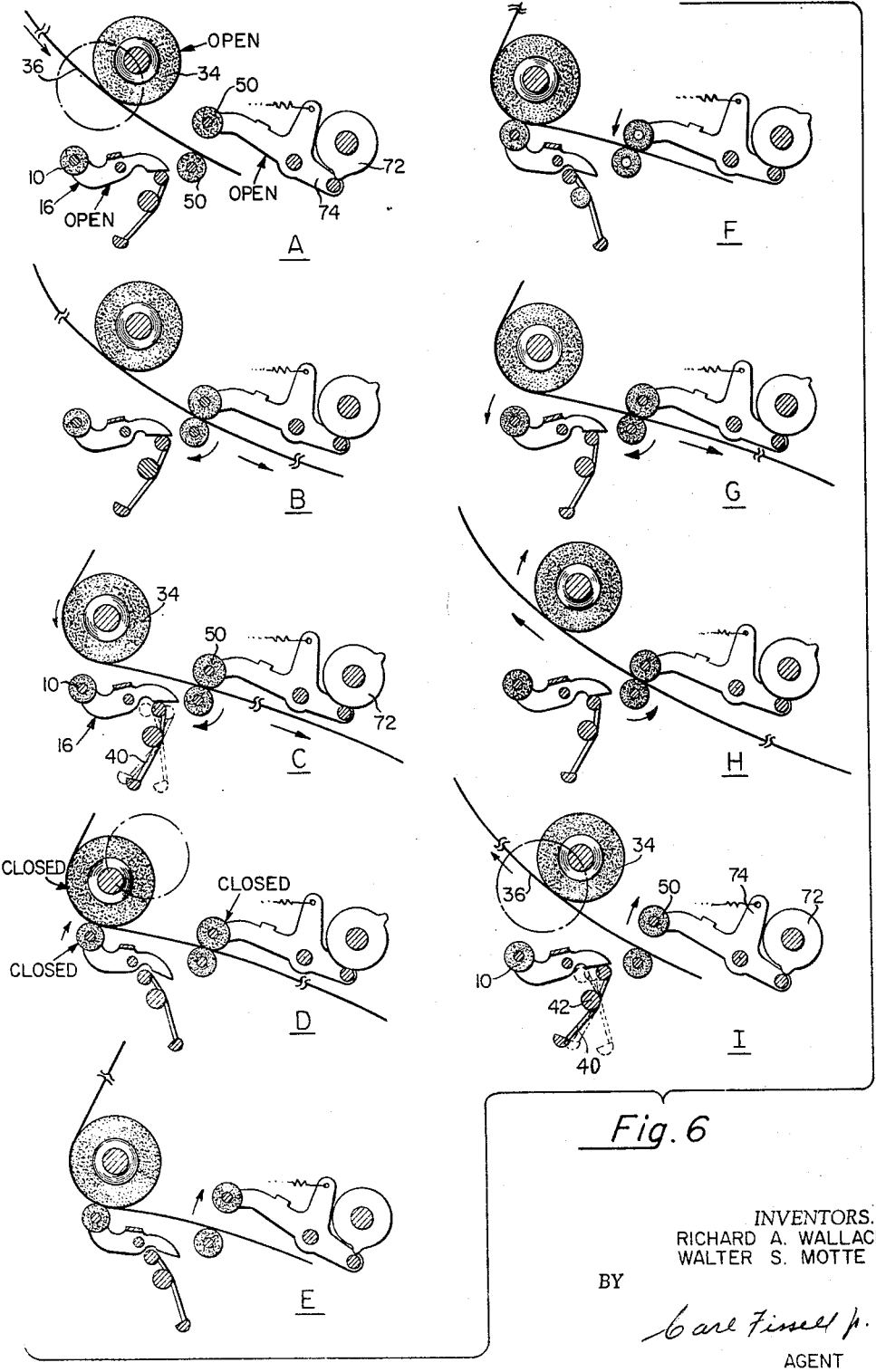
Fig. 6 is a step by step schematic illustration of the various positions assumed by the platen pressure roller and document feed roller mechanisms of the present invention during its operation.

The instant invention is described herein in connection with the carriage structure of a well-known accounting machine. However, since the basic principles of operation of this machine generally are well-known, only that portion of the carriage mechanism pertinent to the instant invention will be described in detail. For a reference to the basic accounting machine itself, recourse may be had to Butler Patent No. 2,629,549. The present accounting machine is adapted to be operated automatically. To this end the carriage thereof is provided with a number of electrical and mechanical timing cams, the major and minor lobes of which are configured to produce a timed cycle of operation such that the associated document drive rollers will be advanced or engaged and drive the document into and out of the carriage at a time in the cycle of operation when the document has been released from between the platen and the platen pressure rollers, as will hereinafter be described.

Referring now to the drawings and more particularly to Fig. 1 thereof, there is shown a partial front elevational view of a preferred embodiment of the present invention associated with a carriage of the type described and claimed in the foregoing Deighton application Serial No. 598,454. A plurality of platen pressure rollers similar to the rollers 10 are rotatably mounted by any suitable means such as stud 12 and C ring 14 on a rockable T-shaped pressure roller support assembly or link 16.

Each roller 10 is or may be fabricated from some more or less resilient material e.g., rubber, which is adapted to frictionally grip or engage a document 36 (Fig. 3) such as a paper ledger. Support 16 comprises a central body portion having a trailing camming section 18 (Figs. 3 and 4), a central U-shaped mounting portion 20, and a substantially vertically depending portion 22, Fig. 4, notched as at 24 to retain one end of spring 26, the opposite end of which is attached to the carriage frame 28.

In the present embodiment, a plurality of platen pressure rollers 10, preferably twelve in all, are equally spaced transversely of carriage 30 by means of pivot shaft 32. As seen in Fig. 4, each roller is independently biased into engagement with the platen by means of the springs 26. The platen rollers each being single unitary assemblies and evenly spaced across the carriage, provide equal and evenly distributed pressure against the platen 34 regardless of the width of document 36.

Platen 34, the platen opening and closing driving linkage (Figs. 7 and 8), and the platen rotating mechanism, Fig. 5, in the preferred embodiment set forth herein, is substantially identical in construction and operation to the platen opening and closing mechanism of Butler, 2,629,549, with certain basic and novel differences noted in the present application. This mechanism is shown most clearly in Fig. 101 of Butler and is described therein at column 110 beginning at line 6 and at column 126, line 17.

Referring to Fig. 5 of the present application automatic line-spacing rotation of the platen 34 during machine operation is effected by driving the ratchet wheel 35 by means of a power actuated line-spacing pawl 37. The pawl 37 is pivotally mounted intermediate its ends on an eccentric bushing 38 on a stud 39 in the upper end of the curved arm 41. The arm is secured on a shaft 43 journalled in the end plate 52. A tension spring 45 connected to the arm 41 constantly urges the latter rightwardly, as shown in Fig. 5.

A bail 47 extending substantially from end to end of the carriage is secured to the depending end portion 49 of the arm 41 and may be swung rightwardly by power in a selected machine operation as described in the Butler patent to rock the shaft 43 counterclockwise.

As the shaft 43 is swung counterclockwise the arm 41 is likewise swung counterclockwise and thrusts the pawl 37 leftwardly. The pawl 37 is adapted in its leftward movement to engage and drive the ratchet wheel 35 and the platen clockwise to line space the document as desired.

As shown in Figs. 3 and 4 of the present application, an actuating bail 40 rotatably mounted on transverse shaft 42 is driven by roller studs 44 and 46 which are adapted to be moved forwardly and rearwardly, i.e., leftwardly and rightwardly, respectively, as viewed in Figs. 3 and 4, by means described in detail in the aforementioned sections of the Butler patent.

Bail 40 carries at its upper end follower roller 48. The rearwardly slanting camming surface 18 of the pressure roller support or carrier 16 is adapted to be engaged by roller 48 so that as bail member 40 is rocked about its pivotal axis 42, follower 48 rotates against the surface 18 and cams the platen pressure roller 10 out of engagement with platen 34 and into the position shown in Fig. 3. Since each pressure roller assembly is provided with an identical structure including the camming surface, etc., and since the bail 40 extends transversely across the platen 34 and is engageable with the camming surface 18 of each roller assembly, all of the rollers are thus adapted to be retracted or withdrawn from engagement with the platen simultaneously. The mechanism for opening and closing the platen pressure roller assembly is located relative to the movable carriage such that the platen pressure rollers can be engaged with or disengaged from the platen at any tabular position in which the carriage may be located.

Rearwardly of and slightly below the platen 34, as viewed in Figs. 3 and 4, is located a row of document drive or feed rollers 50—50 which are supported on the chute lip 51, and, as set forth in Deighton et al., are adapted when energized to move the document or ledger sheet 36 into and reversely out of the carriage 30 in accordance with the prescribed cyclical operation called for by the automatic controls of the accounting machine with which the carriage structure is utilized.

In order to prevent tearing, stretching or yawing of the document, the platen pressure rollers and the document drive or feed rollers must not engage the document simultaneously, e.g., at such times as the platen is feeding the document outwardly or the document rollers are feeding the document inwardly. Conversely, in order to prevent buckling of the document, the platen pressure rollers must not be permitted to close on the document or to feed the document inwardly while the document feed rollers are driving the document outwardly with respect to the carriage. To provide precise and exact control at all times over the document, regardless of its direction of movement and regardless of whether or not the platen pressure rollers or the document feed rollers are advanced or engaged, a novel camming arrangement is incorporated into the present apparatus, as will now be described.

Figure 7:
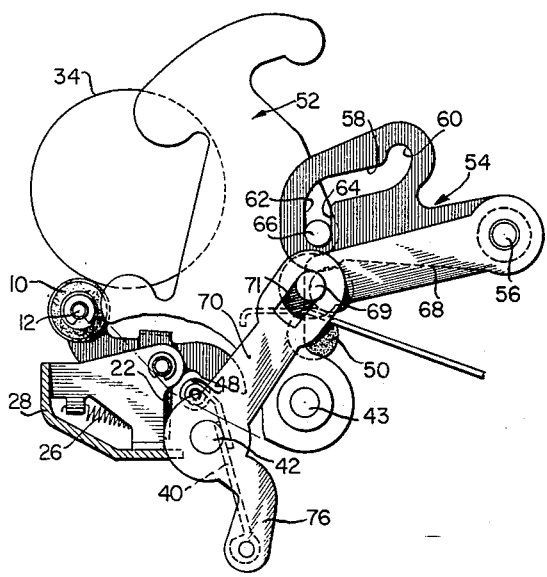
Figs. 7 and 8 are side elevational views illustrating the carriage opening and closing camming structure in the closed and open conditions, respectively.
Figure 8:
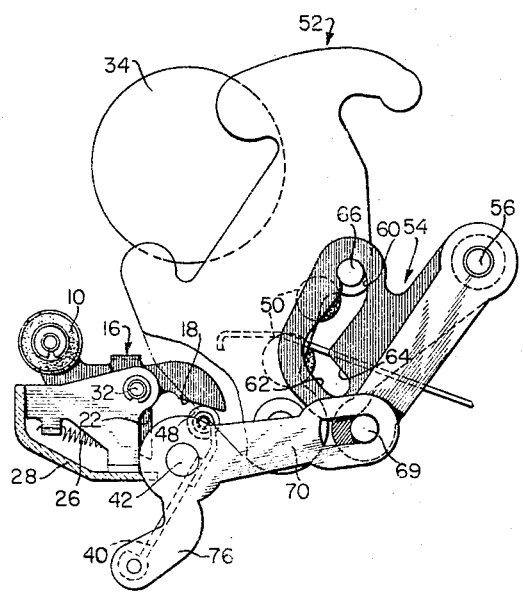

Referring particularly to Figs. 7 and 8 of the drawings, there is shown a platen frame end plate 52 similar to the platen frame end plate 1088 of the aforementioned Butler patent. A separate frame end plate is disposed at opposite ends of the platen 34 and rockably supports the platen relative to the carriage, as in Butler. A cam arm 54 is provided at each opposite end of a shaft 56 which is disposed transversely across the carriage structure. A cam slot 58 in each cam arm has an upper rear and a lower front dwell portion 60 and 62, respectively. The lower portion 62 is extended linearly as shown at 64 in Figs. 7 and 8. A pin roller 66 fixed to the side surface of the frame end plate 52 and received in the cam slot 58 in cam arm 54 permits the platen 34 to be rocked arcuately, upwardly as will now be described. The straight portion 64 provides for a relatively long time period during which the shaft 56 and roller 66, although moving with respect to the carriage, transmit no force to the cam arms 54—54. Unless and until the cam arms actually move with respect to the roller 66 the platen 34 will remain in the closed condition of Fig. 7.

Link 68 is attached to and movable with shaft 56. Link 70 engages link 68 by means of the pin 69 projecting from link 68 and is slidable in the slot 71 in link 70. Link 70, rockable about shaft 42 is provided with a depending leg 76 which is secured to and movable with the bail member 40. When bail member 40 is swung leftwardly from the position of Fig. 7 to that of Fig. 8 the cam arms 54—54 are swung downwardly, causing the rollers 66—66 and thus the platen frames 52—52, to move rightwardly about the shaft 43 to retract the platen 34 arcuately upwardly away from its printing position, Figs. 4 and 7.

In machines of the Butler type when the platen opens the platen pressure rollers rise for approximately 80% of the upward travel of the platen while still against the platen. Conversely, on the closing of the platen, the platen pressure rollers meet the platen at the first 20% of its downward travel and continue down against the platen pulling the document forward.

In the earlier mentioned Deighton et al. machine the carriage was designed with a semi-automatic pressure roller restraining mechanism which prevented any skid of the document. Skidding of the document would obviously nullify the automatic line finding feature as before mentioned.

The present invention avoids the limitations inherent in the Deighton carriage arrangement by placing the platen pressure rollers on a rockable support or bracket 16 which is attached to the standard Butler carriage opening and closing bail 40 as before described. The actuating bail cams the pressure rollers away from the platen 34 before the platen moves and holds them in retracted condition at a fixed distance, by means of the dwell surface 62, while the platen 34 opens and closes. After the platen is closed the cam follower 48 leaves the cam surface 18 and by virtue of the spring 26 the pressure rollers contact the platen and maintain uniform but distributed pressure against the document 36. Since the platen is fully advanced or closed before the pressure rollers engage it there is no possibility of document skid. In addition this pressure roller action is available regardless of when in the machine cycle, or how many times the carriage is opened or closed.

Referring to Figs. 3, 4 and 6, it can be seen that the document feed or drive rollers are located immediately behind and slightly below the axial center of the platen. Each set of upper and lower rollers 50—50 is cam actuated by a mechanism all similar to the cam 72 and link 74 shown in Fig. 6.

The timing arrangement between the platen opening and closing mechanism including the platen pressure roller apparatus and the document feeding rollers, as shown in Fig. 6, is such that the document feed rollers 50—50 are disengaged immediately after the platen pressure rollers 10 have engaged the document.

This effect is produced by means of the motion of the roller 66 within the cam slot 58. The long dwell provided by the slot in the cam arms 54 affords sufficient time within which the platen pressure rollers are lowered or retracted out of engagement with the platen, while the document feed rollers engage the document. Following this time period the platen 34 rises very rapidly to its open position, Fig. 8, due to the harmonic motion resulting from the combination of the cam slot design and the configuration of the mechanism for retracting the platen end plates.

The operational sequence of the platen pressure rollers 10, the platen 34 and the document feed or drive rollers 50—50 are set forth in Fig. 6 and described in conjunction with the following chart:

*Operational sequence*

| Fig. 6 | Condition of Carriage | Platen | Platen pressure Rollers | Document Feed Rollers |
|---|---|---|---|---|
| A | Before feeding sheet. | Open (retracted) | Open | Open. |
| B | To feed sheet | do | do | Closed. |
| C | To avoid Buckling. | Closed (advanced). | do | Do. |
| D | Paper Stationary Control being transferred from F. R. to P. R. | do | Closed | Do. |
| E | For Printing | do | do | Open. |
| F | Paper Stationary control being transfered from P. R. to F. R. | do | do | Closed. |
| G | To avoid Stretching Paper. | do | Open | Do. |
| H | To feed Sheet | Open (retracted) | do | Do. |
| I or A | Before Feeding | do | do | Open. |

Although the present invention is illustrated in connection with an automatic accounting machine of the Butler type, it is to be understood that the principles of operation set forth herein are applicable to any accounting machine wherein the means for feeding the document is separate and distinct from the means for controlling the opening and closing of the platen. As can be seen from Fig. 6 in positions D and F as set out in the chart, the platen mechanism, the platen pressure rollers and the document feed rollers are closed simultaneously. This state is a momentary condition during which the document is at rest and lasts only sufficiently long enough to permit the electrical circuits (not shown) to switch control from the document feed rollers to the platen pressure rollers and vice versa. Obviously, any movement or attempted movement of either roller mechanism during the time when the document is gripped thereby would result in a torn or badly buckled document or in the disorientation of the automatic line finding feature common to the aforementioned machine.

Still referring to Fig. 6 and assuming that a normal cycle of operation is employed, the operator inserts a document into the open platen of the machine. The sequence of operation is as follows:

As seen in Fig. 6A, the platen 34 is retracted to the "open" full line position as are the platen pressure rollers 10 and the document feeding rollers 50—50.

The platen 34 remains retracted as do the platen pressure rollers until the document contacts means (not shown) which initiates the overall machine operation, as set forth in detail in the earlier mentioned Deighton et al. application, Serial No. 598,454. At this time, Fig. 6B, cam 72 rotates in a direction such that the link 74 carrying the upper feed roller 50 engages the lower feed roller 50. Whereupon, as shown in Fig. 6C, the feed rollers are revolved and the document 36 is fed into the machine carriage. During this portion of the cycle both the platen and the platen pressure rollers remain open as at Fig. 6C.

At the termination of its linear movement into the carriage the document is halted momentarily, Fig. 6D. Control thereover is transferred from the document feed roller mechanism to the platen pressure roller mechanism so that at this time in the cycle the platen is closed, the document feed rollers are closed (engaged) and the platen pressure rollers are closed (Fig. 6D).

The document is now stationary Fig. 6D, at the printing station (not shown). At this time the document feed rollers are opened, Fig. 6E, while the platen pressure rollers grip the document for advancement after printing, if necessary.

As shown in Fig. 6F, after printing, control of the document is returned to the document feed roll mechanism. In this condition with the document at rest the platen is closed and both the platen pressure rollers and the document feed rollers grip the document momentarily.

The platen pressure rollers are next disengaged from the platen as shown in Fig. 6G, after which the document is drawn into the carriage by the feed rollers 50—50.

The platen is then retracted to the open position as shown in Fig. 6H while the document feed rollers 50—50 drive the document outwardly from the carriage.

Finally, the document 36 is moved to the position of Fig. 6I. As the document comes to rest both the platen pressure rollers 10 and the document feed rollers 50—50 are retracted or disengaged thus releasing the document for removal from the carriage by the operator.

Under ordinary circumstances as the platen opening and closing mechanism is moved the document 36 would tend to be stretched around the circumference of the platen since the pressure rollers have engaged the platen and are moved upwardly with it. In the present invention, however, due to the long dwell of the cam arms 54—54 and the release of the document 36 by the feed rollers 50—50, stretching or buckling of the document is completely eliminated.

What is claimed is:

1. In combination with an accounting machine carriage, a platen, a frame mounting for said platen adapted when moved to rock said platen from a closed to an open condition, a plurality of platen pressure rollers, means mounting said rollers in spaced apart relationship, means to engage and disengage said pressure rollers with said platen, a cam rockably mounted with respect to said platen frame and provided with a first and a second dwell portion, the first dwell portion being substantially longer than the second, means on said frame engaging said cam and movable thereby from said first to said second dwell portions whereby said platen is rocked from its closed to its open condition, and means interengaging said cam and said pressure roller engaging and disengaging means whereby said pressure rollers are caused to engage said platen when the latter is in its closed condition.

2. The invention according to claim 1 wherein the means to rock the platen pressure rollers into and out of engagement with the platen comprises a transverse bail member and wherein said bail member is provided with means engageable with a source of power for rocking said member.

3. In a machine of the class described, a carriage movable to a plurality of tabular positions for printing, a rotatable platen mounted on said carriage, a plurality of platen pressure rollers movable into and out of engagement with said platen and adapted when engaged therewith to constrain a record document thereagainst, pressure roller engaging means releasably biasing said rollers into engagement with said platen, a supporting link, a plurality of upper document feeding rollers carried by said link, a plurality of lower feed rollers engageable with said upper feed rollers, means for operatively connecting certain of said feeding rollers to a source of power, a rotatable cam adapted to move said supporting link in one direction for engaging said feed rollers to feed the document when said platen is out of printing position, means for moving said platen into and out of printing position and means interengaging said platen moving means and said pressure roller engaging means whereby said pressure rollers are moved out of engagement with said platen when said platen is moved out of printing position.

4. In an accounting machine the combination of a movable carriage, a platen support secured to said carriage, a platen rotatably mounted on said support and movable between a closed throat active printing position and an open throat inactive non-print position and return, a plurality of platen pressure rollers, means supporting said platen pressure rollers on said carriage parallel and adjacent to said platen and including means biasing said pressure rollers against said platen, means cooperating with said supporting means to move said pressure rollers away from said platen, a member engaging said platen support to move said support whereby said platen is moved from its printing position to its non-printing position and return, said member including means cooperating with said platen support for delaying movement of said platen to its open throat position, and means interconnecting said member and said pressure roller moving means, movement of said interconnecting means causing said pressure roller moving means to retract said platen pressure rollers from said platen during the delayed movement of said platen from said closed to said open throat position.

5. In combination with a movable accounting machine carriage, a mounting frame, a platen rotatable on said frame, said frame being adapted to move said platen from a closed to an open throat position and return, a plurality of platen pressure rollers, means mounting said pressure rollers in spaced apart relationship parallel to said platen, means to engage said pressure rollers with said platen, means to disengage said pressure rollers from said platen, a rotatable shaft, a cam rockably mounted on said shaft and having first and second dwell portions, the first dwell portion being substantially longer than the second dwell portion, a cam follower on said frame, means rocking said shaft to cause said cam follower to move from said first to said second dwell portions whereby said frame moves said platen from its closed to its open position, and means interengaging said shaft and said pressure roller disengaging means for moving said pressure rollers out of engagement with said platen before said platen is moved to its open position by said cam.

6. In combination with an accounting machine including a carriage movable to a plurality of tabular positions and including a sheet item receiving throat formed between adjacent portions of the machine into which items may be inserted and from which they may be removed, a platen supporting frame on said carriage, a platen rockably mounted on said frame, means to rock said frame to move said platen from an open throat non-print position to a closed throat print position and return, a platen pressure roller support disposed on said carriage, means mounting a plurality of platen pressure rollers on said support parallel to said platen, means engaging said mounting means urging said pressure rollers against said platen, means for moving said mounting means to disengage said pressure rollers from said platen, and a broken link mechanism interconnecting said frame rocking means and said pressure roller disengaging means, a plurality of pairs of item feed rollers disposed adjacent to and axially aligned with said platen, means biasing a roller of each pair of rollers into engagement with the other roller of each pair, and means for separating the rollers of each pair of item feed rollers when the platen and pressure rollers are engaged.

7. In an accounting machine wherein a carriage is movable to a plurality of tabular positions and wherein a sheet item or document is adapted to be inserted into and removed from a throat formed between adjacent portions of said machine, the combination comprising, a rockable platen frame, a platen rotatable on said frame, means to rotate said platen, a platen pressure roller supporting frame coextensive with said platen, a plurality of pressure rollers rotatably disposed at intervals along said supporting frame, means constantly urging said pressure rollers in a direction so as to engage said platen, means for disengaging said pressure rollers from said platen, a shaft extending transversely of said carriage and parallel to said platen, a cam on said shaft, means on said platen supporting frame engaging said cam to rock said platent from one to the other of its positions and back again, a first link on said shaft, a transverse rockable bail on said carriage parallel to said platen, said bail engaging said pressure roller moving means for moving the pressure rollers out of engagement with said platen, a second link interconnecting said bail and said first link and adapted to translate rocking movement of said bail into rotary motion of said shaft whereby movement of said pressure rollers away from said platen occurs prior to movement of said platen to an open throat position.

8. In combination with an accounting machine including a carriage movable to a plurality of tabular positions, a pivotally movable platen supporting frame bearing a rotatable platen thereon, and rockable back and forth to move said platen from a closed print position to an open non-print position, a first movable shaft extending parallel to said platen, a cam member fixed to and movable with said shaft, said cam member having a cam slot including first and second dwell portions interconnected by a relatively straight portion, means on said platen supporting frame slidable in said cam slot and adapted thereby to open and close said platen, a platen pressure roller support extending parallel to said platen, a plurality of pressure roller support members pivotally mounted transversely across said platen roller support, each of said members bearing a platen pressure roller on one end thereof, means biasing said platen pressure rollers into engagement with said platen, a second movable shaft extending parallel to said platen, a rockable drive bail on said second shaft carrying cam rollers engageable with the opposite ends of each of said members for camming said pressure rollers out of engagement with said platen, a lost motion linkage interconnecting said first and second shafts, and means for rotating said second shaft in one direction simultaneously to move said pressure rollers away from said platen and to actuate said lost motion linkage first to cause said slidable means to move in the first dwell of said cam slot and thereafter cause said slidable means to move along the straight portion of said cam and into said second dwell portion thereby to move said platen to its open position.

References Cited in the file of this patent

UNITED STATES PATENTS

| | | |
|---|---|---|
| 2,118,700 | Crossman | May 24, 1938 |
| 2,139,168 | Muller | Dec. 6, 1938 |